Figure 1:
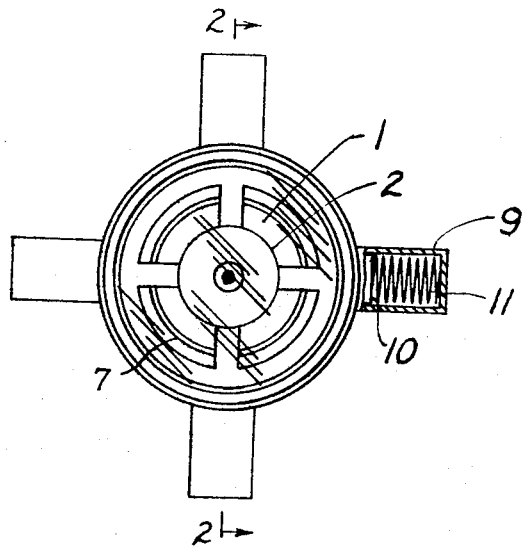

United States Patent

Vartia

[15] 3,662,705
[45] May 16, 1972

[54] SPEED CONTROLLED WHEEL BALANCE INDICATOR

[72] Inventor: Karl O. Vartia, 5214 Grover Ave., Austin, Tex. 78756

[22] Filed: Apr. 23, 1971

[21] Appl. No.: 136,937

[52] U.S. Cl. ............................116/114 R, 73/457, 73/487, 116/28
[51] Int. Cl. ..........................................G01m 1/00
[58] Field of Search ............73/66, 457, 460, 487; 116/114, 116/28

[56] References Cited

UNITED STATES PATENTS 2,818,830   1/1958   Kester...................................116/114
3,289,483   12/1966   Slemmons...............................73/459

Primary Examiner—Richard C. Queisser
Assistant Examiner—Herbert Goldstein

[57] ABSTRACT

In an indicator device using a float immersed in viscous fluid at the axis of rotation of a rotating assembly to detect unidirectional, cyclically repeated accelerative forces acting upon the assembly, a speed responsive mechanism is arranged to allow float movement only while rotation is occurring at higher than a prescribed minimum speed thus permitting observation of indicator position at any time after the assembly is brought to a halt.

1 Claim, 3 Drawing Figures

PATENTED MAY 16 1972

3,662,705

Karl O. Vartia
INVENTOR.

SPEED CONTROLLED WHEEL BALANCE INDICATOR

This invention is an improvement on my earlier invention as disclosed in application, Ser. No. 840,903, filed July 11, 1969, now U.S. Pat. No. 3,585,962, dated June 22, 1971, titled WHEEL BALANCE INDICATOR. The basic invention as disclosed in my earlier application comprised a transparent fluid-filled chamber adapted to be mounted at the axis of rotation of an automobile wheel assembly, and having in the chamber a movable element of less density than the fluid so that rotation of the assembly would tend to float the movable element to the axis of rotation, and under continued balanced conditions would cause the center of gravity of the movable element to coincide with the axis of rotation. However, if the assembly were unbalanced, at higher speeds the unbalanced forces would tend to alternately lift the wheel from the roadway and then impact it against the roadway. These impacts in a given direction would displace the movable element away from the axis in a specific direction and thus indicate the fact of an unbalanced condition and the general direction of the unbalance in the assembly. The viscosity of the fluid in the chamber, as a minimum, must be sufficient to maintain an increment of the displacement resulting from one road impact against the centering centripetal force during the remainder of the cycle so that the displacement can build up to an observable value.

In my earlier invention the fluid viscosity and relative densities of the fluid and movable element were so proportioned that following a period of vehicle operation sufficient to cause the position of the movable element to reach an average equilibrium position the vehicle could be halted and the position of the movable element observed before any significant movement from the equilibrium position could occur. If desired, greater time for observation could be obtained by increasing the fluid viscosity or by decreasing the flotation of the movable element or by decreasing the area for fluid movement within the chamber, but with the penalty in each case of a longer period of required operation to bring the movable element to operational equilibrium from the position at the edge of the chamber, to which it normally floats while the vehicle is halted.

According to my present invention the movable element within the fluid-filled chamber is restrained from movement except during periods of rotation at highway speed. Thus fluid viscosity need only be sufficient to retain an increment of impact displacement through a rotation cycle as described above. Float equilibrium position is attained relatively quickly and is then observable at any time after the vehicle is halted. Although for cross country operation there is but little advantage over a slow-moving float according to my earlier invention, the speed responsive control herein disclosed provides significant advantages for vehicles operated primarily in suburban service without long periods of high speed operation.

Figure 3:
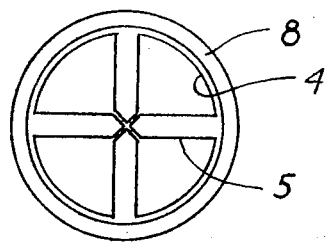
Figure 2:
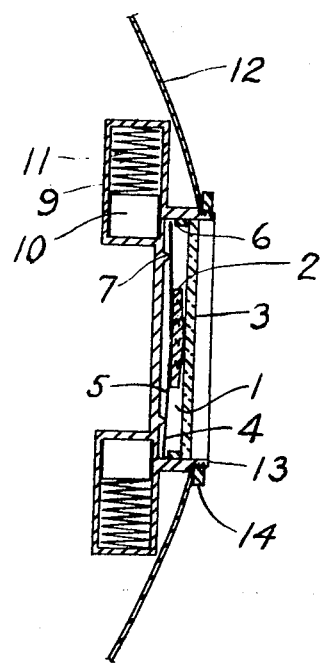

For further description of my invention reference is made to the attached drawings in which FIG. 1 is an elevation and partial section of my invention without the wheel cover or hubcap in which it would normally be mounted, FIG. 2 is a cross-section of FIG. 1, including a portion of the hubcap or wheel cover, and FIG. 3 is a plan view of the so-named "finger plate" which is used to apply pressure against the movable float when movement is not desired.

In the fluid-filled chamber 1 is the movable float 2 whose position is observable through transparent face 3. Immediately behind float 2 in chamber 1 is finger plate 4 with fingers 5. Finger plate 4 is held in position in chamber 1 between the outer shoulder 6, which engages the outer edge of the plate, and the inner fulcrum ring 7 which contacts fingers 5. Finger plate 4 may be made entirely of thin magnetic material or may be a composite of thin plastic with a ring 8 of magnetic material attached thereto. Immediately behind chamber 1 are located a plurality of radially positioned tubes 9 in which permanent magnets 10 are pushed against inner abutments by springs 11 so as to be located directly back of the outer edge of finger plate 4. When the magnets are in this position the fingers 5 of finger plate 4 are pulled against the fulcrum ring 7 with sufficient force to bend the inner ends of fingers 5 into contact with the float and to then hold the float in functionally unmovable condition between the fingers and transparent face 3. Float 2 and face 3 are appropriately marked with, preferably, a dot and a circle to define the float center of gravity and the axis of rotation respectively.

The strengths of springs 11 and their elasticity constants are so proportioned that at a predetermined speed, say 60 miles per hour, the magnets leave their inner abutments and move outwardly a sufficient amount to leave plate 4 functionally free of magnetic influence. This in turn allows fingers 5 to straighten, and float 2 is then free to seek equilibrium between the radial and uni-directional accelerations incident to vehicle operation so long as vehicle speed remains above the predetermined minimum.

It is obvious from the functional description that the shells of chamber 1 and tubes 9 must be magnetically transparent. Also, float 2 must not incorporate any magnetic material lest its movement be magnetically influenced. For mounting the assembly upon the hubcap or wheel cover 12 the housing of chamber 1 may incorporate a threaded projection 13 extending through a hole of appropriate size in the hub cap or wheel cover to engage a nut 14.

Although I prefer to use movable permanent magnets as an actuating device for float restraint, as disclosed herein, I am aware that alternative arrangements such as battery-powered electro-magnets with centrifugally actuated switches, or direct mechanically actuated restraints upon float movement could be used to accomplish the purposes of my invention as defined in the attached claim.

I claim:

1. A device for detecting unbalanced radial forces in a rotating assembly, comprising a chamber containing a viscous fluid and a movable element of less density than said fluid immersed in said fluid, said chamber being adapted to be mounted at the axis of rotation of said rotating assembly whereby centrifugal forces due to rotation will tend to cause said movable element to become centered at the axis of rotation, the dimensions of said chamber and said movable element being such that the movable element can move radially in any direction from a position at the axis of rotation, and restraining means mounted adjacent said axis for restraining said movable element to prevent any movement thereof relative to the containing chamber below a predetermined speed of rotation of the chamber about its axis of rotation and releasing said movable element at or above said predetermined speed.

* * * * *